Patented Apr. 5, 1932

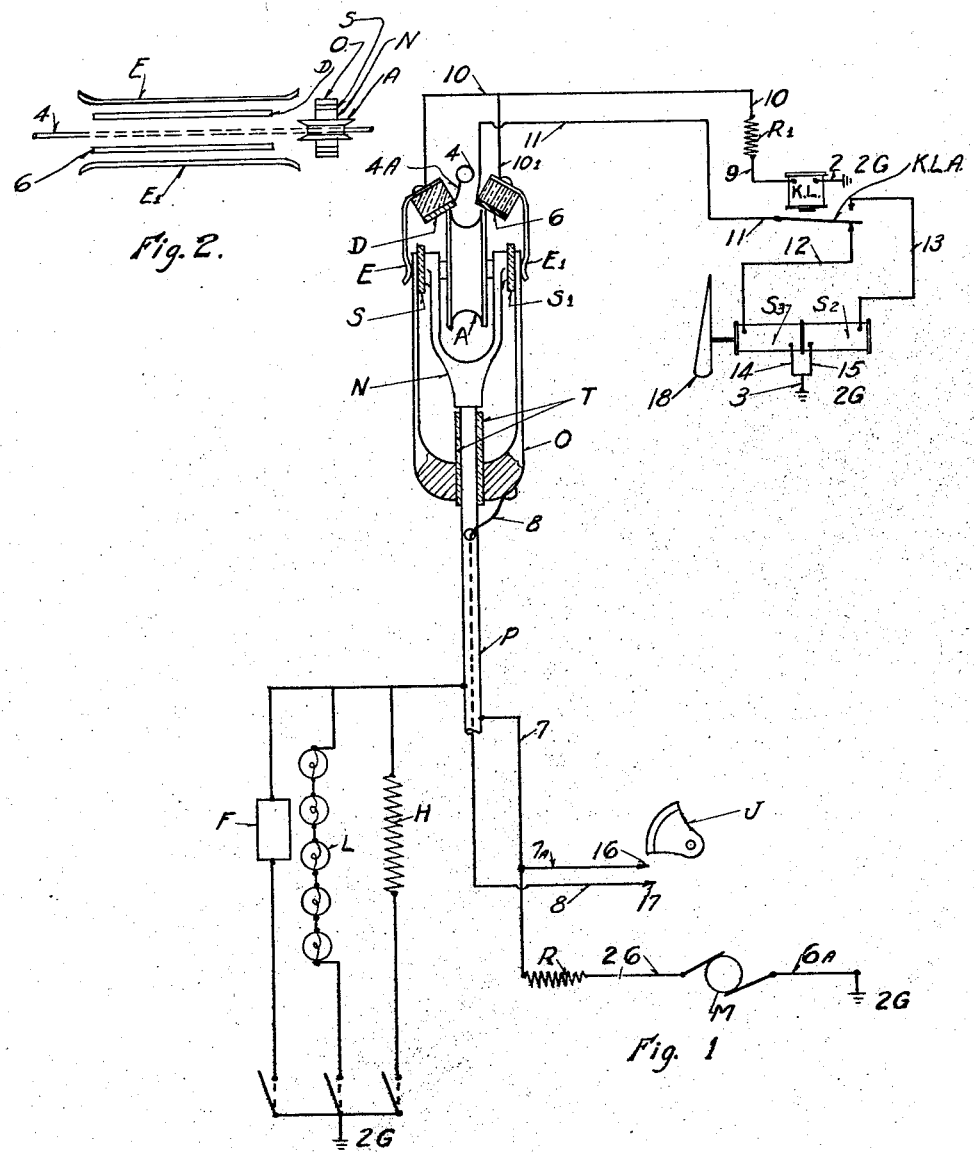

1,852,149

UNITED STATES PATENT OFFICE

MILTON W. COOKE, OF MOUNT LEBANON, PENNSYLVANIA, AND SAMUEL S. STOLP, OF LOUISVILLE, KENTUCKY

TROLLEY HARP CONTROL OF CURRENT SELECTIVE RELAY

Application filed February 18, 1928. Serial No. 255,371.

Our invention relates to an electric control system for electric railways or vehicles which employ a trolley pole, trolley harp and an electric switch throwing apparatus for operating the switch point according to whether an electric car is carrying its trolley wheel under a contacting device mounted adjacent the trolley wire with its controller set for power or without power, however the current drawn for propelling the car is not a factor in our new control system.

The object of our invention is to provide a modified type of trolley harp to control a current selective relay equipment to insure definite operations of the switch throwing apparatus under all possible operating conditions, and to eliminate the objectionable and ever-increasing false operations when the current flowing to the car motors is employed to operate the selective relay.

As a direct result of the growth of electric railways, the trend is to larger cars. The addition of these larger cars in electric railway systems introduces a problem that is very serious in its consequent effect of the control systems hereinbefore employed for automatic electric track switch operations. It is well known to those skilled in the art of automatic switch operation that in the larger cars which are equipped with many new electrically operated devices, that the added electrical consumption of same is steadily reducing the margin between the auxiliary currents and that consumed by the electric car which is the basis for the present day accepted and practically universal system of selecting the solenoid of the switch throwing device for the "straight ahead" or "curved" directions which employs the car motor current.

As in the case with most electric railway systems, these modern cars have been added on to their systems in addition to the old and lighter type where a greater margin of current exists between the power on and power off operations. It is quite evident that the current used by the auxiliary circuits on the larger type cars approach the maximum current drawn by the smaller or lighter cars. Inasmuch as the amount of current to be used by the various cars can not be predetermined or controlled, without introducing serious and objectionable complications, the control system must be designed to adjust itself to the varied degrees of current drawn.

A further object of our invention is to provide means through the use of a special trolley harp and kindred apparatus which will provide a means for operating a relay which is to select the proper solenoid for the desired operation of the switch point and overcome the developing difficulties encountered by the use of standard apparatus and to cause the apparatus to be substantially infallible regardless of the margin of difference between the values of current incident to the operation of all classes of cars for corresponding operations that is, with power on or with power off.

In the accompanying drawings:—

Figure 1 is a combined circuit and apparatus diagram, illustrating our improved method of operating automatic electric switches.

Fig. 2 is a diagrammatic representation of the "trolley pan" or contactor.

In Fig. 1 a trolley pan or contactor is represented adjacent trolley wire 4. Trolley wheel A is shown in contact with electric conductor strips D, 6 of the trolley pan, and is carried on trolley pole P. Insulated from this pole and harp by insulation T, S, S1 is a supplemental metallic yoke O. Rigidly secured to and electrically insulated from trolley pan 1 are flexible prongs E, E—1, which are so arranged and disposed that they will contact with yoke O in its normal course of travel. They are electrically connected by wires 10, 10—1 and resistor R—1 to relay KL. which is in turn connected to the ground 2—G through wire 2. To contactor strip 6 is connected armature K. L. A. by wire 11. K. L. A. is so positioned that through its front contact it will cause current to energize solenoid S—2 through wire 13 and solenoid S—3 through wire 12. These solenoids are connected to the ground 2—G by wires 3, 14 and 15.

To yoke O is connected an insulated wire 8 which passes through pole P to contact 17. To pole P is electrically connected wire 7 which with wire 7A carries current to contact 16. Wire 7 also carries current through resistor R, wire 26 to motor M which is indicated as being connected to ground 2—G by wire 6A. Contacts 16 and 17 are preferably located in the controller and are so arranged that segment J, also incorporated in the controller, can be rotated to close or open contacts 16, 17 and the circuit connected thereto. Contacts 16 and 17 are closed by segment J when the controller is operated to supply propulsion current to the motor. In the closed position and with trolley wheel A in contact with trolley pan strips as shown in Fig. 1, current will pass from trolley wire 4, connector 4—A, contactor strip D, through the trolley pole wires 7, 7—A, contact 16, segment J, contact 17, wire 8, yoke O, either or both prongs E, E—1, wires 10, 10—1, resistor R—1, and energize KL, which will cause armature K. L. A. to engage its front contact and thereby energize solenoid S2 and cause plunger to operate the switch tongue 18. With segment J out of contact with contacts 16, 17, current will pass from trolley wire 4, connector 4A, strip D, trolley wheel A, strip 6, wire 11, armature K. L. A. to solenoid S3 and will operate switch point 16 to the opposite position to that effected by the operation previously described. Thus the selective relay performs its function by being definitely energized or being left definitely de-energized.

It must be remembered that well known standard contactors may be employed with prongs E, E—1 placed in advance of the metallic strips D, 6, as indicated in Fig. 3, so that K. L. will be positioned according to the will of the operator of segment J.

While we prefer to establish electrical connections between 16 and 17 with J being operated from the controller so that the established system of power on and power off may be employed to set and operate the electric track switch, an independent switch, suitably located, for instance in the floor, may be utilized.

F. L. H. represents respectively, an air compressor, electric lights, and heaters. They are shown connected to trolley pole P with switches intervening which completes the circuit to ground.

What we claim is:—

1. A switch operating system, comprising in combination, a trolley conductor, an electrically operated track switch provided with a pair of solenoids, a branched circuit to each of said solenoids of said track switch, electrically actuated circuit controlling means operated from a vehicle to control the said circuit for transmitting current from the conductor to either of said solenoids of said track switch to operate it in the desired direction, said means being selectively actuated independent the magnitude of current flowing in the circuits of the said vehicle.

2. A switch operating system, comprising in combination, a trolley conductor, an electrically operated track switch to be selectively actuated from a vehicle, a branched circuit to the track switch, electrically actuated circuit controlling means to control the said circuit for transmitting current from the conductor to the track switch to operate it in the desired direction, said means being selectively actuated independent the magnitude of current flowing in the circuits of the said vehicle.

3. In a system of the class described, the combination of a track solenoid, a trolley contactor, a current collector for cooperating with the trolley contactor to energize the said track solenoid, a switch between the trolley contactor and track solenoid, electrical means for operating the said switch, said means arranged to be selectively placed in shunt with the circuits of a vehicle when the said current collector engages the trolley contactor.

In testimony whereof I affix my signature.
MILTON W. COOKE.
In testimony whereof I affix my signature.
SAMUEL S. STOLP.